(12) United States Patent
Ueda (10) Patent No.: US 12,412,099 B2
(45) Date of Patent: Sep. 9, 2025

(54) NOISE WAVEFORM REMOVING DEVICE, MODEL TRAINING DEVICE, NOISE WAVEFORM REMOVING METHOD, MODEL TRAINING METHOD, GENERATION MODEL, AND WEARABLE DEVICE

(71) Applicant: CASIO COMPUTER CO., LTD., Tokyo (JP)

(72) Inventor: Masashi Ueda, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 1031 days.

(21) Appl. No.: 17/474,981

(22) Filed: Sep. 14, 2021

(65) Prior Publication Data

US 2022/0092434 A1 Mar. 24, 2022

(30) Foreign Application Priority Data

Sep. 18, 2020 (JP) ................. 2020-157821

(51) Int. Cl.
*G10K 11/16* (2006.01)
*G06N 3/045* (2023.01)
*G06N 3/088* (2023.01)
*G10K 15/02* (2006.01)

(52) U.S. Cl.
CPC ............ *G06N 3/088* (2013.01); *G06N 3/045* (2023.01); *G10K 11/16* (2013.01); *G10K 15/02* (2013.01)

(58) Field of Classification Search
CPC ........ G06N 3/088; G06N 3/045; G10K 11/16; G10K 15/02

USPC ................................ 381/71.1, 71.8
See application file for complete search history.

(56) References Cited

U.S. PATENT DOCUMENTS

2018/0064397 A1   3/2018   Horikawa et al.
2019/0187297 A1*  6/2019   Li ..................... G01S 19/49

FOREIGN PATENT DOCUMENTS

| CN | 111564160 A   |   | 8/2020  |             |
|----|---------------|---|---------|-------------|
| CN | 111564160 B   | * | 10/2022 | G10L 21/0208|
| JP | 2006034479 A  |   | 2/2006  |             |
| WO | 2016133088 A1 |   | 8/2016  |             |

OTHER PUBLICATIONS

Japanese Office Action (and an English language translation thereof) dated Apr. 25, 2023, issued in counterpart Japanese Application No. 2020-157821.
Chinese Office Action (and an English language translation thereof) dated May 29, 2023, issued in counterpart Chinese Application No. 202111083636.3.

* cited by examiner

*Primary Examiner* — Ammar T Hamid
(74) *Attorney, Agent, or Firm* — Holtz, Holtz & Volek PC (57) ABSTRACT

A noise waveform removing device includes one or more processors that are configured to obtain noise-containing movement waveform data; use a trained generation model, to determine a filter contribution rate based on the noise-containing movement waveform data; and generate noise-free movement waveform data, based on the determined filter contribution rate and the noise-containing movement waveform data.

11 Claims, 11 Drawing Sheets

NOISE WAVEFORM REMOVING DEVICE, MODEL TRAINING DEVICE, NOISE WAVEFORM REMOVING METHOD, MODEL TRAINING METHOD, GENERATION MODEL, AND WEARABLE DEVICE

CROSS-REFERENCE TO RELATED APPLICATIONS

The present application is based upon and claims the benefit of priority under 35 USC § 119 of Japanese Patent Application No. 2020-157821 filed on Sep. 18, 2020, the entire contents of which, including the description, claims, drawings, and abstract, are incorporated herein by reference.

BACKGROUND OF THE INVENTION

1. Field of the Invention

The present disclosure relates to a noise waveform removing device, a model training device, a noise waveform removing method, a model training method, a generation model, and a wearable device.

2. Description of the Related Art

WO2016/133088 discloses that, in order to detect movement states of a user during exercise such as running or walking, an acceleration sensor is used. By carrying a wearable device such as a smartphone or the like having such a sensor built in, the user can confirm a movement state that is analyzed based on movement waveform data indicating the movement state obtained by the device.

Meanwhile, when carrying such a wearable device, the user may carry the wearable device in a portable bag such as a pouch.

BRIEF SUMMARY OF THE INVENTION

According to an aspect of the present disclosure, a noise waveform removing device includes one or more processors, wherein the one or more processors are configured to obtain noise-containing movement waveform data; use a trained generation model, to determine a filter contribution rate based on the noise-containing movement waveform data; and generate noise-free movement waveform data, based on the determined filter contribution rate and the noise-containing movement waveform data.

Also, according to another aspect of the present disclosure, a model training device includes one or more processors; and one or more memories, wherein the one or more memories are configured to store training data including noise-containing movement waveform data for training and noise-free movement waveform data for training, and wherein the one or more processors are configured to train a generation model that determines a filter contribution rate based on the noise-containing movement waveform data for training, and a discrimination model that discriminates, from the training data, pseudo noise-free movement waveform data generated based on the filter contribution rate and the noise-containing movement waveform data for training, according to a GAN (Generative Adversarial Network).

DETAILED DESCRIPTION OF THE INVENTION

Conventionally, movement waveform data detected by a wearable device includes not only waveforms caused by landing impacts as desired data, but also waveforms caused by non-landing impacts as noise, and thereby, the wearable device cannot correctly determine the moving state of the user from the movement waveform data obtained by the inertial sensor.

According to the present disclosure, such noise can be removed from such movement waveform data including the noise. In the following embodiments, a noise waveform removing device that uses a trained generation model, to generate noise-free movement waveform data in which noise caused by non-landing impacts is removed from noise-containing movement waveform data; and a model training device that uses a discrimination model, to train the generation model according to a GAN (Generative Adversarial Network), are disclosed.

[Overview of the Present Disclosure]

Figure 1:
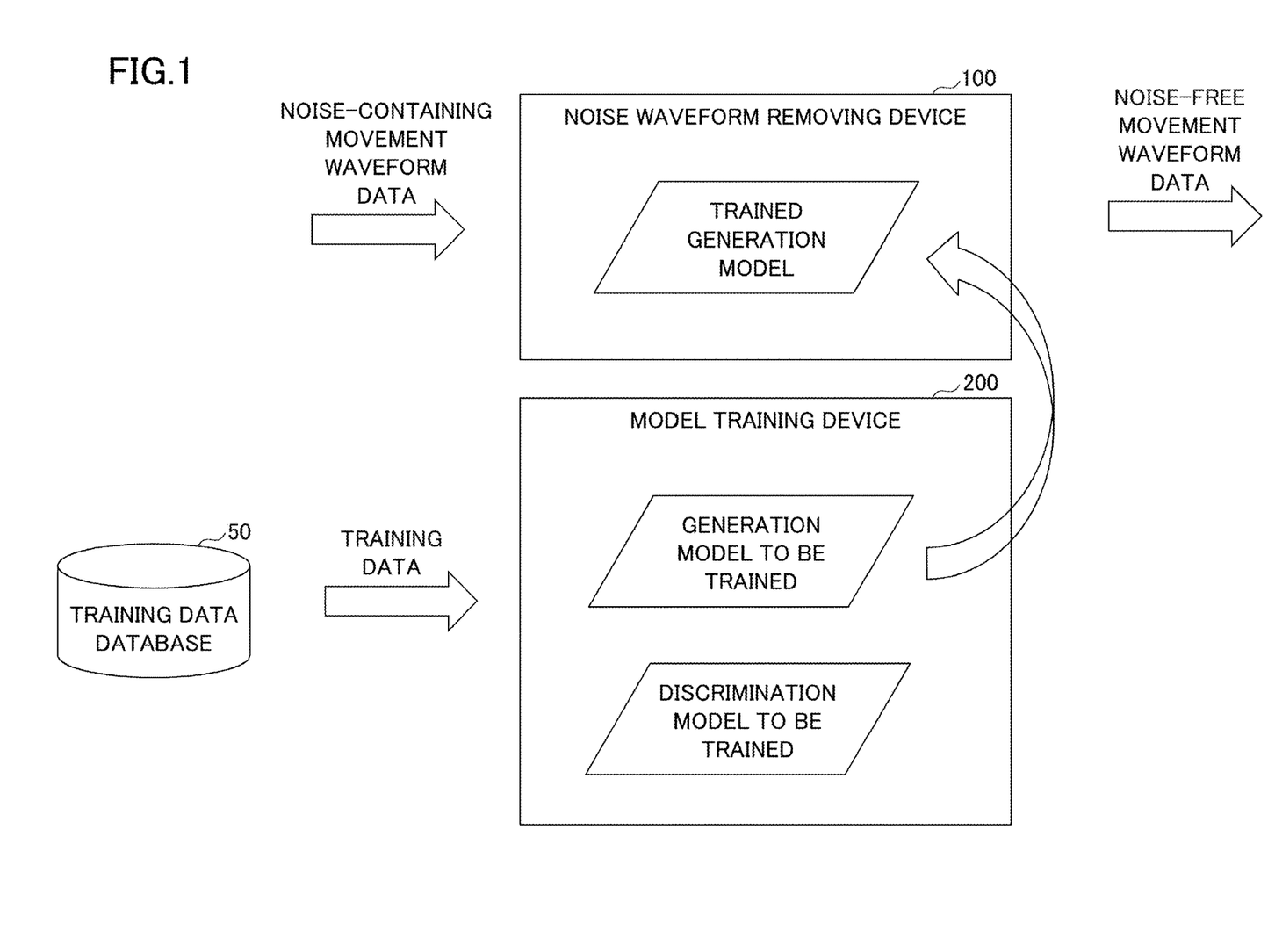
FIG. 1 is a schematic diagram illustrating a noise waveform removing device and a model training device according to an embodiment in the present disclosure.
Figure 2A:
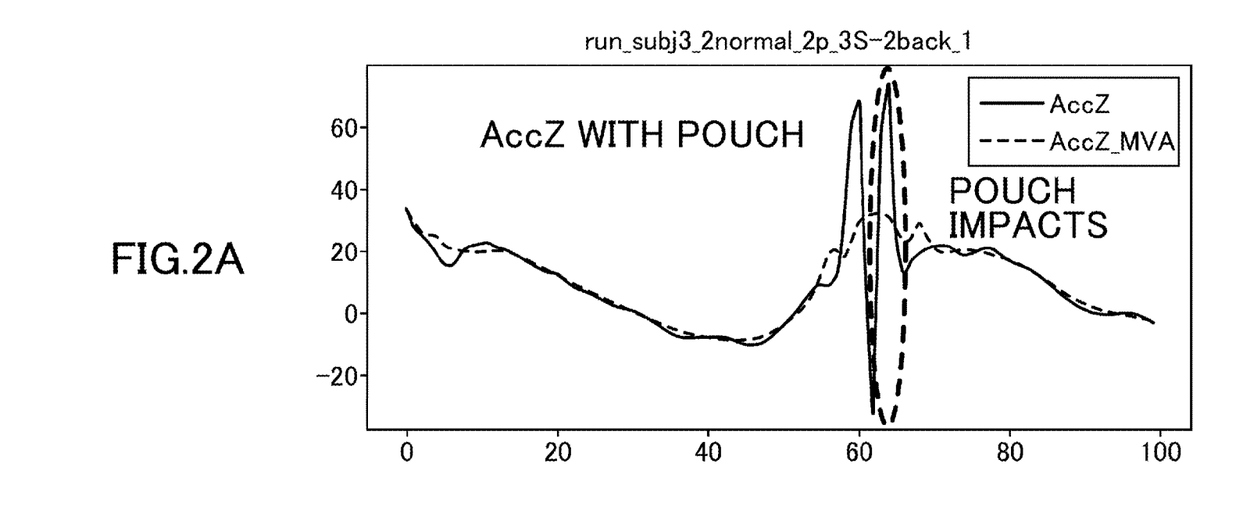
FIGS. 2A-2B are diagrams illustrating a noise-containing movement waveform and a noise-free movement waveform according to an embodiment in the present disclosure.
Figure 2B:
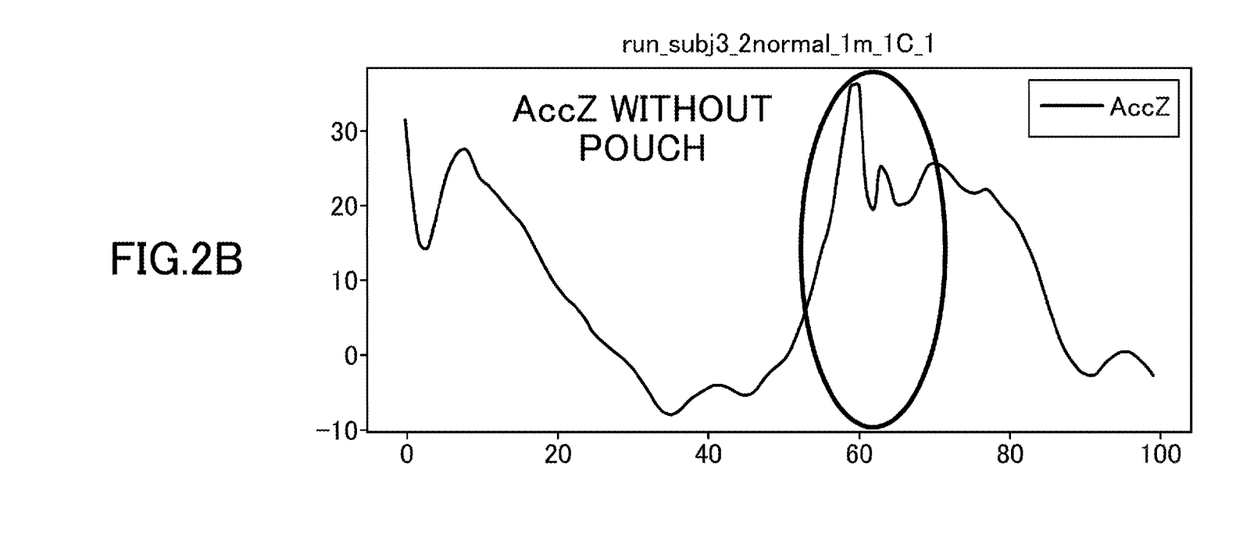

To summarize the embodiments to be described below, as illustrated in FIG. 1, a noise waveform removing device 100 inputs noise-containing movement waveform data including noise caused by non-landing impacts into a trained generation model, to obtain a filter contribution rate from the trained generation model. The noise waveform removing device 100 executes filtering according to the filter contribution rate, to remove noise from the noise-containing movement waveform data, so as to generate the noise-free movement waveform data. For example, if noise-containing movement waveform data caused by pouch impacts as illustrated in FIG. 2A is detected by a wearable device to detect movement waveforms, as illustrated in FIG. 2B, the noise waveform removing device 100 executes filtering according to the filter contribution rate output from the trained generation model, to generate noise-free movement waveform data in which noise in a dashed-line oval in FIG. 2A is removed as in a solid-line oval in FIG. 2B.

The generation model is trained by the model training device 200 according to a GAN. In other words, the model training device 200 obtains training data or correct answer data constituted with a pair of noise-containing movement waveform data for training and noise-free movement waveform data for training from a training data database 50, to train the generation model and the discrimination model corresponding to the generation model, according to the GAN. The generation model generates a filter contribution rate from the noise-containing movement waveform data for training, and the model training device 200 applies filtering to the noise-containing movement waveform data for training according to the output filter contribution rate, to obtain pseudo noise-free movement waveform data.

Once having obtained, as input data, any one of the pseudo noise-free movement waveform data, the noise-containing movement waveform data for training, or the noise-free movement waveform data for training, the discrimination model discriminates whether the input data is pseudo data generated by the generation model, or training data, and further discriminates whether the input data includes noise. The model training device 100 trains the discrimination model so as to output correct discriminated results, and trains the generation model so as to output false discriminated results, according to the GAN.

According to the present disclosure, unlike normal GAN-based learning, instead of generating an output waveform directly, an application strength level of the low-pass filter is generated at each time. Compared to the variety of output waveforms themselves, the variety of the application strength level of the low-pass filter is lower; therefore, the generation model can be trained with a small number of training data items. Also, by adopting the filter contribution rate instead of noise-free movement waveform data as the output of the generation model, the problem of what-is-called mode collapse inherent to the GAN, namely, the problem that the generation model outputs specific data that deceives the discrimination model regardless of the input data, can be avoided.

[Hardware Configuration]

Figure 3:
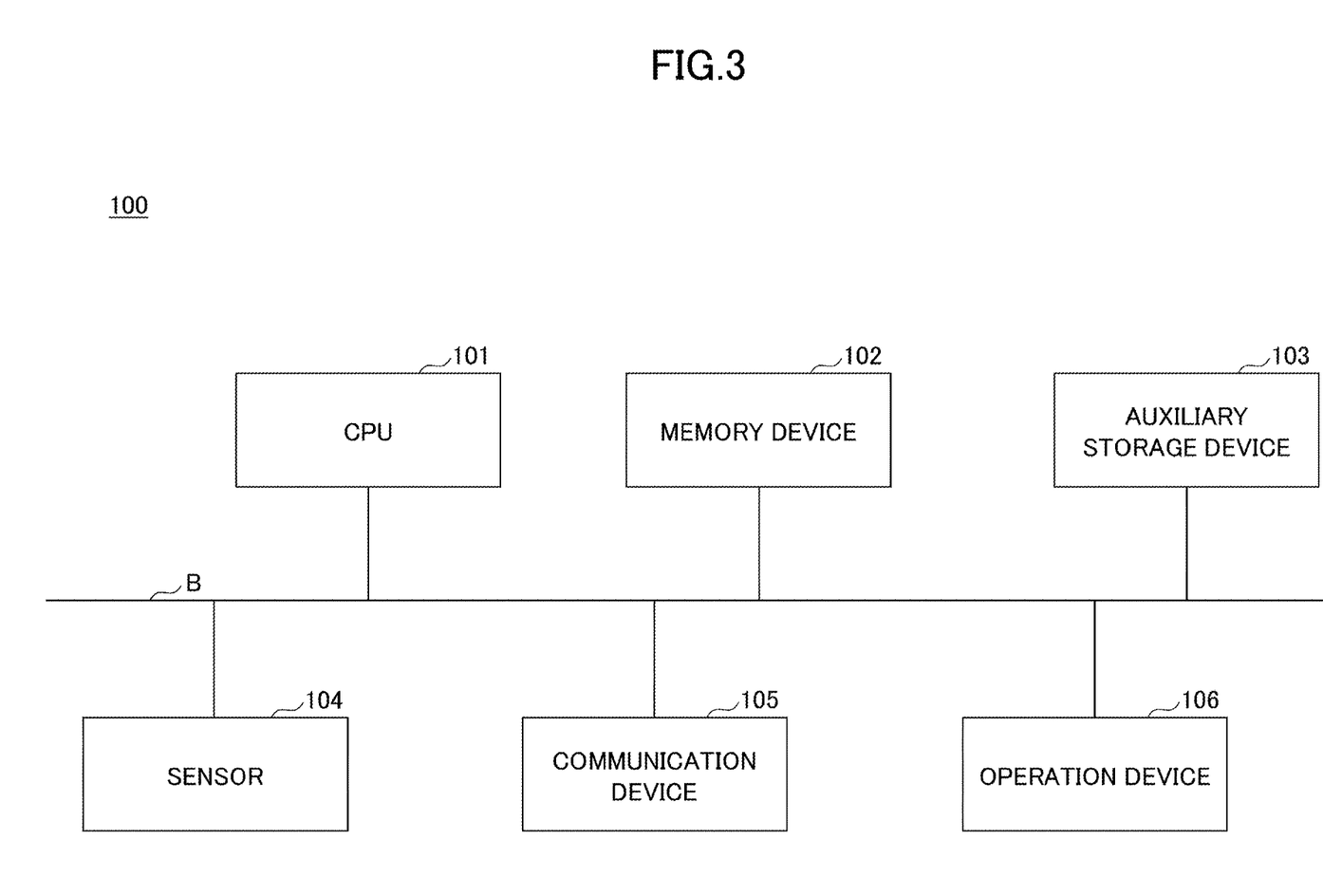
FIG. 3 is a block diagram illustrating a hardware configuration of a noise waveform removing device according to an embodiment in the present disclosure.

Here, the noise waveform removing device 100 may be installed, for example, in a wearable device, and have a hardware configuration as illustrated in FIG. 3. In other words, the noise waveform removing device 100 includes a CPU (Central Processing Unit) 101, a memory device 102, an auxiliary storage device 103, a sensor 104, a communication device 105, and an operation unit 106.

Various computer programs in the noise waveform removing device 100 including programs or instructions that implement various functions and processes as will be described later, are installed in the auxiliary storage device 103, and in the case of receiving a start command of the noise waveform removing device 100, the memory device 102 reads programs and data from the auxiliary storage device 103, to load them. The auxiliary storage device 103 and the memory device 102 are implemented as non-transitory computer-readable recording media that store programs or instructions. The CPU 101 that functions as a processor executes various functions and processes of the noise waveform removing device 100, based on sensor data obtained from the sensor 104, according to programs and various items of data such as parameters necessary to execute the programs, stored in the memory device 102. The sensor 104 may be an acceleration sensor, a gyro sensor, or the like, to detect various items of data associated with movement of the user. The communication device 105 transmits sensor data to other information terminals such as smartphones, smartwatches, and the like. The operation unit 106 may be a switch for turning on/off the wearable device that has the noise waveform removing device 100 installed; a lamp for indicating a power on/off state; a setting button; a display panel; and the like.

Figure 4:
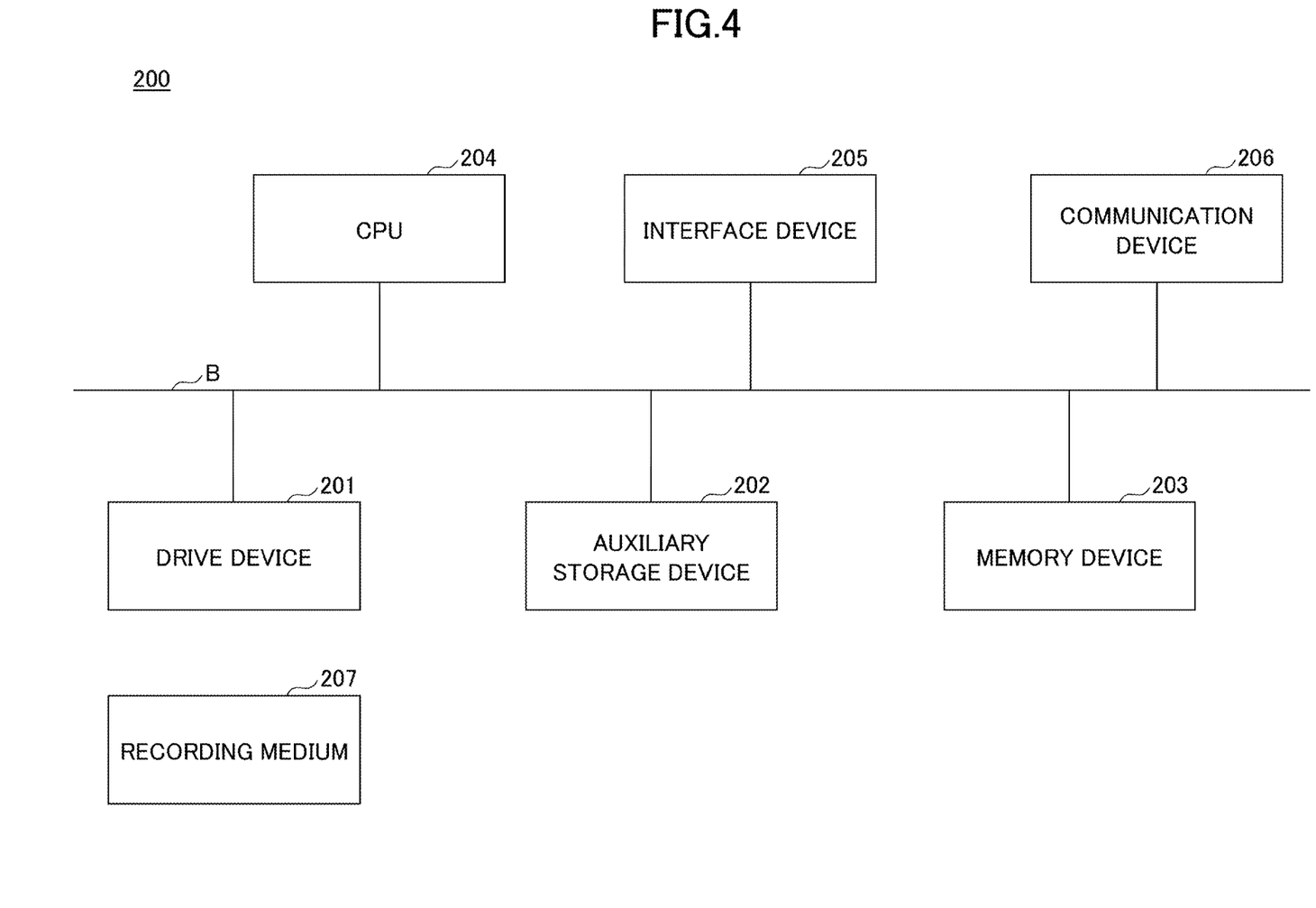
FIG. 4 is a block diagram illustrating a hardware configuration of a model training device according to an embodiment in the present disclosure.

On the other hand, the model training device 200 may be a computer device, for example, a personal computer, server, or the like, and includes a drive device 201, an auxiliary storage device 202, a memory device 203, a CPU 204, an interface device 205, and a communication device 206 mutually connected via a bus B.

Various computer programs in the model training device 200 including programs or instructions that implement various functions and processes as will be described later, may be provided with a recording medium 207 such as a CD-ROM (Compact Disk-Read-Only Memory). Once the recording medium 207 on which the programs are recorded is set in the drive device 201, the programs are installed in the auxiliary storage device 202 from the recording medium 207 via the drive device 201. However, installation of the programs does not need to be executed with the recording medium 207; the programs may be downloaded from any external device via a network or the like. The auxiliary storage device 202 stores the installed programs, together with necessary files, data, and the like. In response to receiving a start command of a program, the memory device 203 reads the program and data from the auxiliary storage device 202, to load them. The auxiliary storage device 202 and the memory device 203 are implemented as non-transitory computer-readable recording media that store programs or instructions. The CPU 204 that functions as a processor executes various functions and processes of the model training device 200, according to programs and various items of data such as parameters necessary to execute the programs, stored in the memory device 203. The interface device 205 includes an input device such as a keyboard and a mouse, an output device such as a display and the like, to be used as a user interface with the user. The communication device 206 executes various communication processes for communicating with an external device.

However, the noise waveform removing device 100 and the model training device 200 are not limited to having the hardware configuration described above; for example, the devices may be implemented with any other suitable hardware configuration such as one or more circuits that implement one or more of the functions and processes executed by the noise waveform removing device 100 and the model training device 200.

[Noise Waveform Removing Device]

Figure 5:
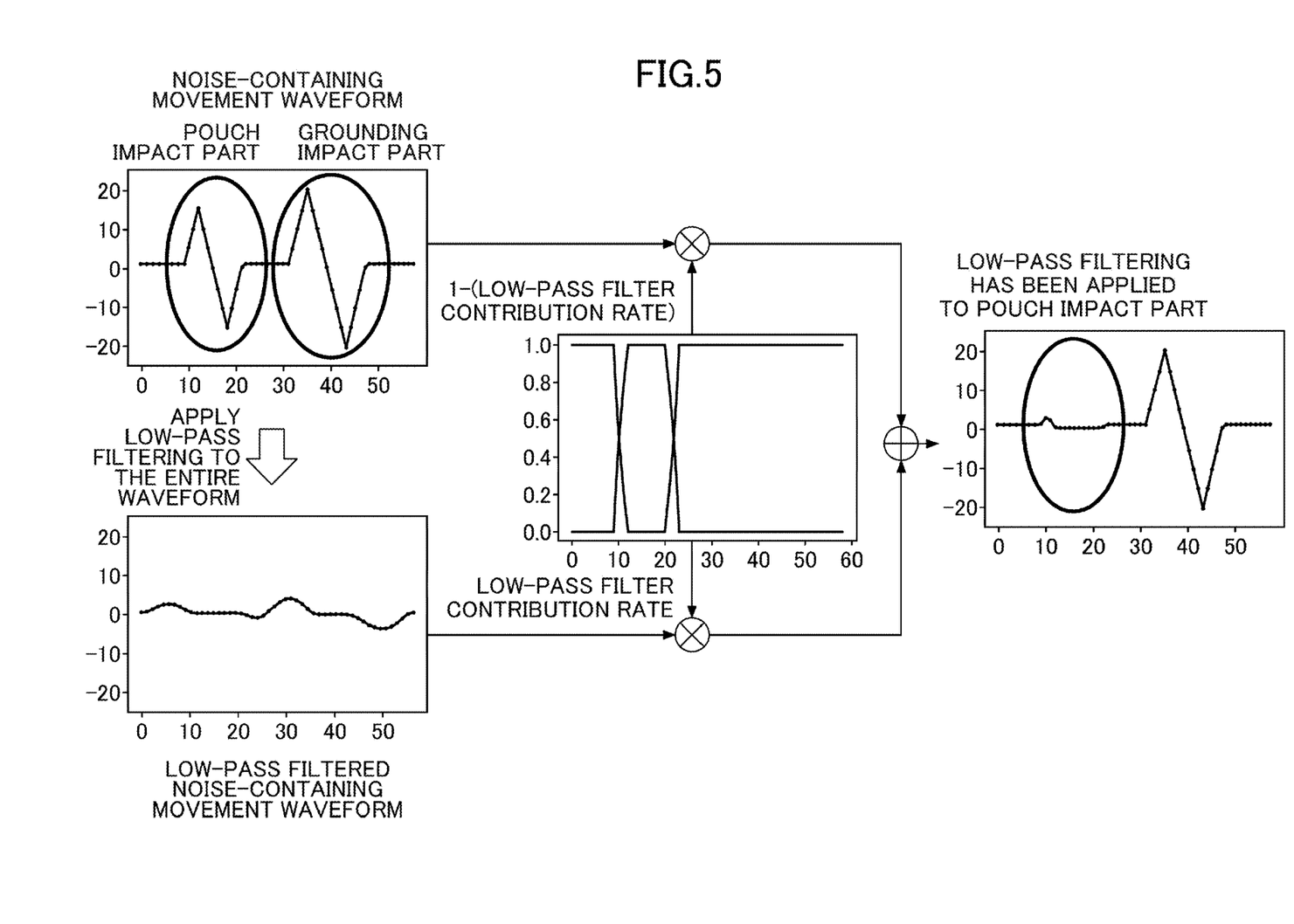
FIG. 5 is a schematic diagram illustrating a noise waveform removing process according to an embodiment in the present disclosure.

Next, with reference to FIGS. 5 and 6, the noise waveform removing device 100 according to an embodiment in the present disclosure will be described. FIG. 5 is a schematic diagram illustrating a noise waveform removing process according to the embodiment in the present disclosure.

As illustrated in FIG. 5, when noise-containing movement waveform data is detected by an inertial sensor (e.g., an acceleration sensor, gyro sensor, etc.), the noise waveform removing device 100 inputs the noise-containing movement waveform data that includes waveform parts caused by landing impacts and waveform parts caused by non-landing impacts caused by contacts with a pouch including the wearable device, into the trained generation model, and applies low-pass filtering to the entire waveform. In the present embodiment, although low-pass filtering is applied as a filtering technique, the present disclosure is not limited as such; any other appropriate type of filtering that is suitable for noise to be removed may be adopted.

The generation model according to the present disclosure predicts a low-pass filter contribution rate that indicates to what extent low-pass filtering needs to be applied to the noise-containing movement waveform data to remove noise at that time, from sampling data of the noise-containing movement waveform data caused by non-landing impacts.

The noise waveform removing device 100 derives first intermediate movement waveform data by multiplying low-pass filtered noise-containing movement waveform data by the low-pass filter contribution rate R, and further derives second intermediate movement waveform data by multiplying the noise-containing movement waveform data by (1−R). Then, the noise waveform removing device 100 calculates the sum of the first intermediate movement waveform data and the second intermediate movement waveform data, to obtain noise-free movement waveform data in which the noise caused by the pouch impact as illustrated in the figure is removed.

Figure 6:
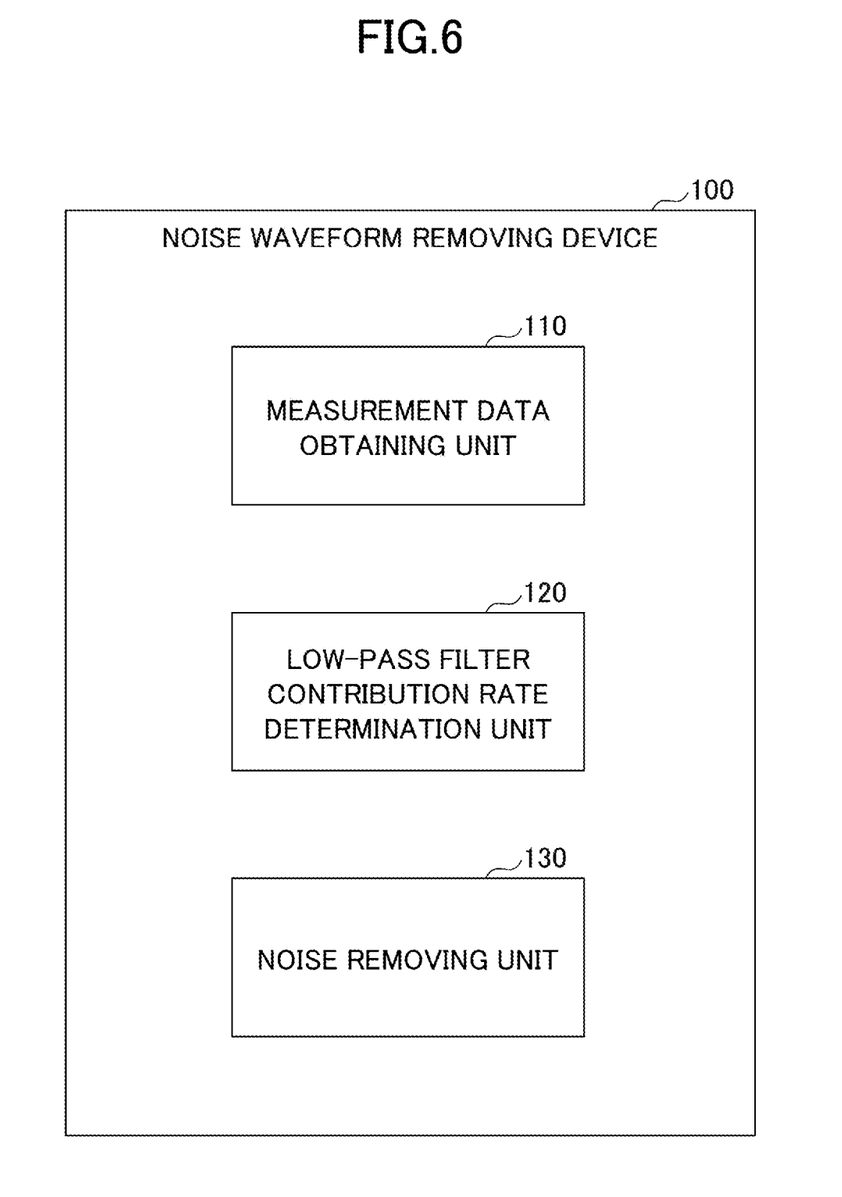
FIG. 6 is a block diagram illustrating a functional configuration of a noise waveform removing device according to an embodiment in the present disclosure.

FIG. 6 is a block diagram illustrating a functional configuration of the noise waveform removing device 100 according to an embodiment in the present disclosure. As illustrated in FIG. 6, the noise waveform removing device 100 includes a measurement data obtaining unit 110, a low-pass filter contribution rate determination unit 120, and a noise removing unit 130.

The measurement data obtaining unit 110 obtains noise-containing movement waveform data. Specifically, the measurement data obtaining unit 110 detects movement waveform data of the user from the inertial sensor (e.g., an acceleration sensor, gyro sensor, etc.) carried by the user, namely, noise-containing movement waveform data, and provides the low-pass filter contribution rate determination unit 120 and the noise removing unit 130 with the detected data. For example, the movement waveform data is constituted with acceleration data and/or angular velocity data.

The low-pass filter contribution rate determination unit 120 uses a trained generation model, to determine the low-pass filter contribution rate based on the noise-containing movement waveform data. Specifically, the low-pass filter contribution rate determination unit 120 inputs the noise-containing movement waveform data extracted at a predetermined sampling rate into the trained generation model, to determine the low-pass filter contribution rate R ($0 \leq R \leq 1$) for low-pass filtering to be applied for removing noise caused by non-landing impacts from the noise-containing movement waveform data.

The low-pass filter contribution rate R takes a value indicating the extent or strength level of application of low-pass filtering; with a value of R closer to 1, stronger low-pass filtering is applied to the noise-containing movement waveform data, and with a value of R closer to 0, weaker low-pass filtering is applied to the noise-containing movement waveform data. For example, a value of R closer to 1 is assigned for a waveform part caused by a non-landing impact as a non-desired waveform so as to apply stronger low-pass filtering, whereas a value of R closer to 0 is assigned for a waveform part caused by a landing impact as a desired waveform so as to apply weaker low-pass filtering.

The noise removing unit 130 generates noise-free movement waveform data based on the determined low-pass filter contribution rate and the noise-containing movement waveform data. Specifically, the noise removing unit 130 applies low-pass filtering to the noise-containing movement waveform data, according to the low-pass filter contribution rate determined by the low-pass filter contribution rate determination unit 120, and more strongly applies filtering to waveform parts corresponding to the non-landing impacts, to generate pseudo noise-free movement waveform data in which waveform parts corresponding to the landing impacts are maintained. In other words, the noise-free movement waveform data output by the noise removing unit 130 may correspond with movement waveform data in which noise caused by impacts other than the landing impacts of the user and detected by the inertial sensor, is removed from the noise-containing movement waveform data.

In one embodiment, the noise removing unit 130 may generate first intermediate movement waveform data by applying the low-pass filter contribution rate R to the low-pass filtered noise-containing movement waveform data; generate second intermediate movement waveform data by applying (1−R) to the noise-containing movement waveform data; and synthesize the first intermediate movement waveform data and the second intermediate movement waveform data, to generate pseudo noise-free movement waveform data. In other words, as illustrated in FIG. 5, the noise removing unit 130 applies low-pass filtering to the entire noise-containing movement waveform data obtained from the measurement data obtaining unit 110, to obtain low-pass filtered noise-containing movement waveform data as illustrated in the figure. Then, the noise removing unit 130 multiplies the low-pass filtered noise-containing movement waveform data by the low-pass filter contribution rate R obtained from the trained generation model, to obtain the first intermediate movement waveform data. Also, the noise removing unit 130 multiplies the noise-containing movement waveform data that is not low-pass filtered, by (1−R), to obtain the second intermediate movement waveform data. Then, the noise removing unit 130 calculates the sum of the first intermediate movement waveform data and the second intermediate movement waveform data, to obtain waveform parts corresponding to non-landing impacts, namely, pseudo noise-free movement waveform data in which the noise is low-pass filtered. Note that measures for obtaining the pseudo noise-free movement waveform data described in the present embodiment is not limited to the method as described above, and the calculation method may be changed, for example, by changing the size of the low-pass filter, or by setting the coefficient of the low-pass filter contribution rate R to a range other than $0 \leq R \leq 1$. For example, the pseudo noise-free movement waveform data may be obtained by setting a coefficient of the contribution rate R' of the low-pass filter to $0 < R \leq 1$, to determine the contribution rate R' by the low-pass filter contribution rate determination unit 120, and based on a low-pass filtering strength level in the case of applying low-pass filtering to the entirety of noise-containing movement data and the contribution rate R'.

[Noise Waveform Removing Process]

Figure 7:
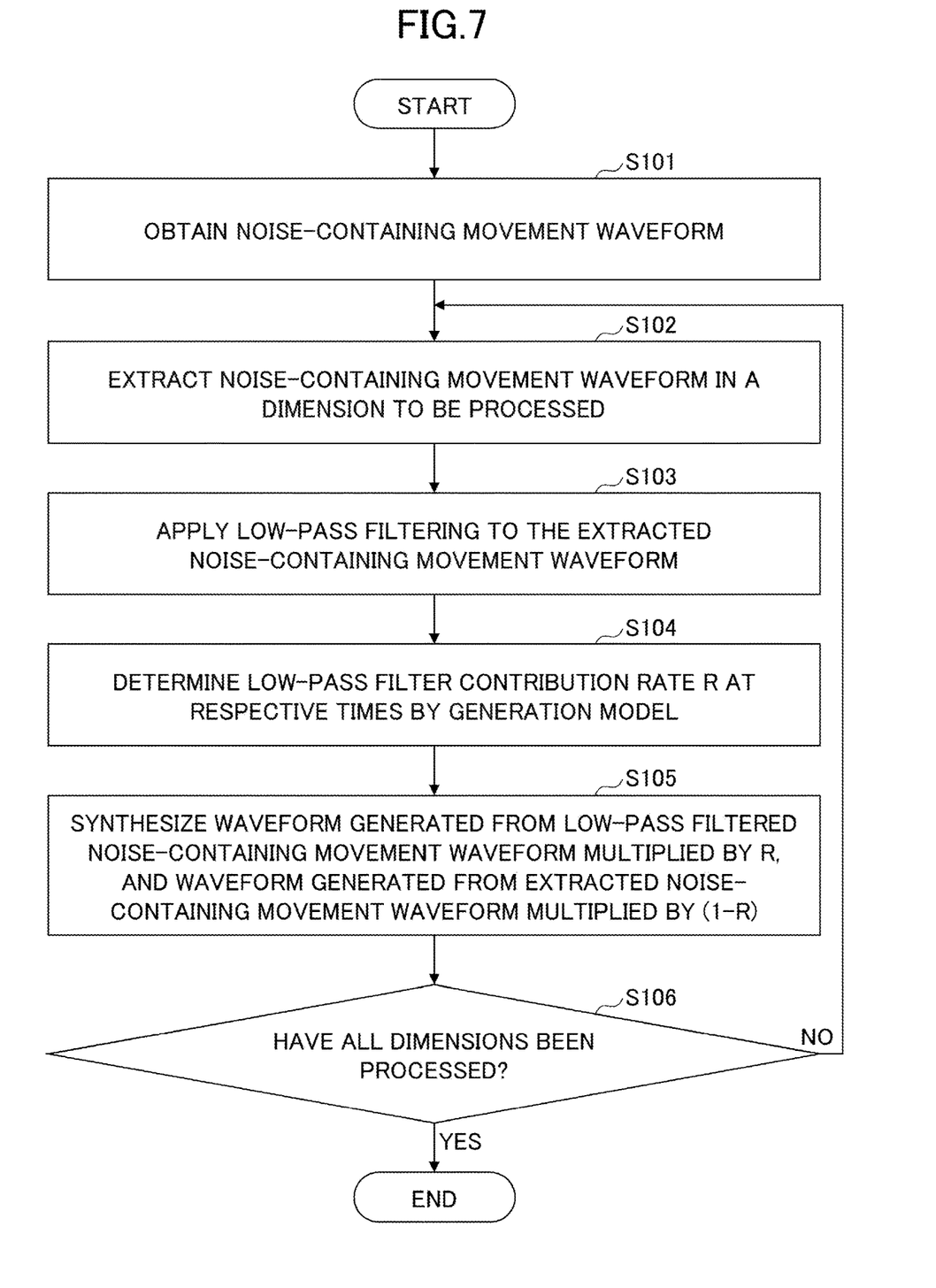
FIG. 7 is a flow chart illustrating a noise waveform removing process according to an embodiment in the present disclosure.

Next, with reference to FIG. 7, a noise waveform removing process according to an embodiment in the present disclosure will be described. The noise waveform removing process is implemented by the noise waveform removing device 100 described above, and may be implemented by, for example, a processor executing a program or instructions. FIG. 7 is a flow chart illustrating a noise waveform removing process according to an embodiment in the present disclosure.

As illustrated in FIG. 7, at Step S101, the noise waveform removing device 100 obtains noise-containing movement waveform data. Specifically, the noise waveform removing device 100 obtains movement waveform data from an inertial sensor, such as an acceleration sensor or a gyro sensor, installed in a wearable device carried by the user. The movement waveform data may include not only waveform parts corresponding to landing impacts but also waveform parts corresponding to non-landing impacts caused by contacts between the wearable device having the inertial sensor installed, and a pouch containing the wearable device. The movement waveform data may include movement waveform data items with respect to three axes in a space to be detected by the acceleration sensor.

At Step S102, the noise waveform removing device 100 extracts noise-containing movement waveform data items in a dimension to be processed. For example, in the case where the noise-containing movement waveform data is constituted with movement waveform data items with respect to the respective three axes in the space, the noise waveform removing device 100 may execute the following Steps S102 to S106 for each axis.

At Step S103, the noise waveform removing device 100 applies low-pass filtering to the extracted noise-containing movement waveform data. Specifically, the noise waveform removing device 100 applies the low-pass filtering to the entire waveform of the noise-containing movement waveform data.

At Step S104, the noise waveform removing device 100 inputs the noise-containing movement waveform data at a reference time into the trained generation model, to determine a low-pass filter contribution rate R ($0 \leq R \leq 1$) at the reference time. For example, with a value of R closer to 1, stronger low-pass filtering is applied to the waveform part, and with a value of R closer to 0, weaker low-pass filtering is applied to the waveform part.

At Step S105, the noise waveform removing device 100 multiplies the low-pass filtered noise-containing movement waveform data by R, to obtain first intermediate movement waveform data. Also, the noise waveform removing device 100 multiplies the noise-containing movement waveform data by (1−R), to obtain second intermediate movement waveform data. Then, the noise waveform removing device 100 synthesizes the first intermediate movement waveform data and the second intermediate movement waveform data, to obtain noise-free movement waveform data in which waveform parts caused by landing impacts are maintained, and waveform parts caused by non-landing impacts have been filtered out.

At Step S106, the noise waveform removing device 100 determines whether all dimensions to be processed have been processed. If all the dimensions have been processed (YES at Step S106), the noise waveform removing process is terminated; or if there remains a dimension yet to be processed (NO at Step S106), the noise waveform removing device 100 repeats Steps S102 to S106.

[Model Training Device]

Next, with reference to FIGS. 8 to 10, a model training device 200 according to an embodiment in the present disclosure will be described. The model training device 200 trains a generation model to be provided for the noise waveform removing device 100 described above. Specifically, the model training device 200 trains the generation model that determines a low-pass filter contribution rate from noise-containing movement waveform data, according to a GAN. In other words, corresponding to the generation model, the model training device 200 obtains, as input data, either one of training data or output data from the generation model, to prepare a discrimination model to discriminate whether the input data is the training data or the output data. Then, the model training device 200 trains the discrimination model so as to output correct discriminated results, and trains the generation model so as to output false discriminated results, according to the GAN. In the present embodiment, although low-pass filtering is applied as a filtering technique, the present disclosure is not limited as such; any other appropriate type of filtering that is suitable for noise to be removed may be adopted.

Figure 8:
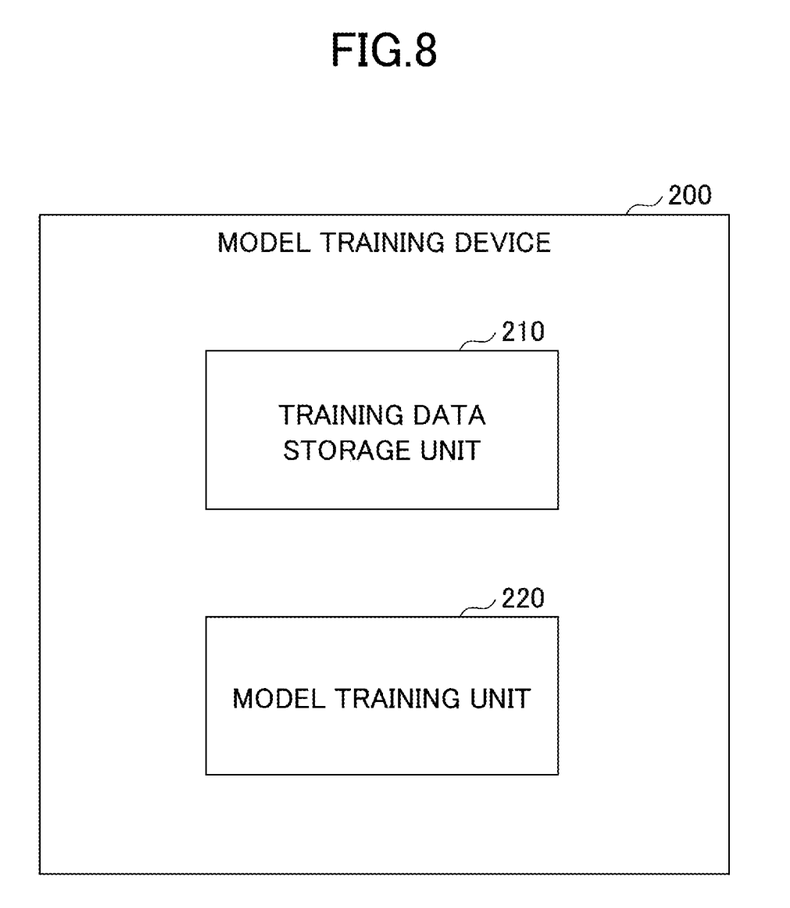
FIG. 8 is a block diagram illustrating a functional configuration of a model training device according to an embodiment in the present disclosure.

FIG. 8 is a block diagram illustrating a functional configuration of the model training device 200 according to an embodiment in the present disclosure. As illustrated in FIG. 8, the model training device 200 includes a training data storage unit 210 and a model training unit 220.

The training data storage unit 210 stores training data including noise-containing movement waveform data for training and noise-free movement waveform data for training. The training data may be referred to as correct answer data. For example, when the user, who carries a wearable device contained in a pouch together with another wearable device attached to the user without being contained in the pouch, performs exercise such as walking, jogging, or the like, movement waveform data is collected simultaneously by the two wearable devices, and thereby, noise-containing movement waveform data for training can be obtained from an inertial sensor of one of the wearable devices, and noise-free movement waveform data for training can be obtained from an inertial sensor of the other wearable device.

The model training unit 220 trains a generation model that determines a low-pass filter contribution rate based on the noise-containing movement waveform data for training, and a discrimination model that discriminates pseudo noise-free movement waveform data generated based on the low-pass filter contribution rate and the noise-containing movement waveform data for training, according to the GAN.

Figure 9:
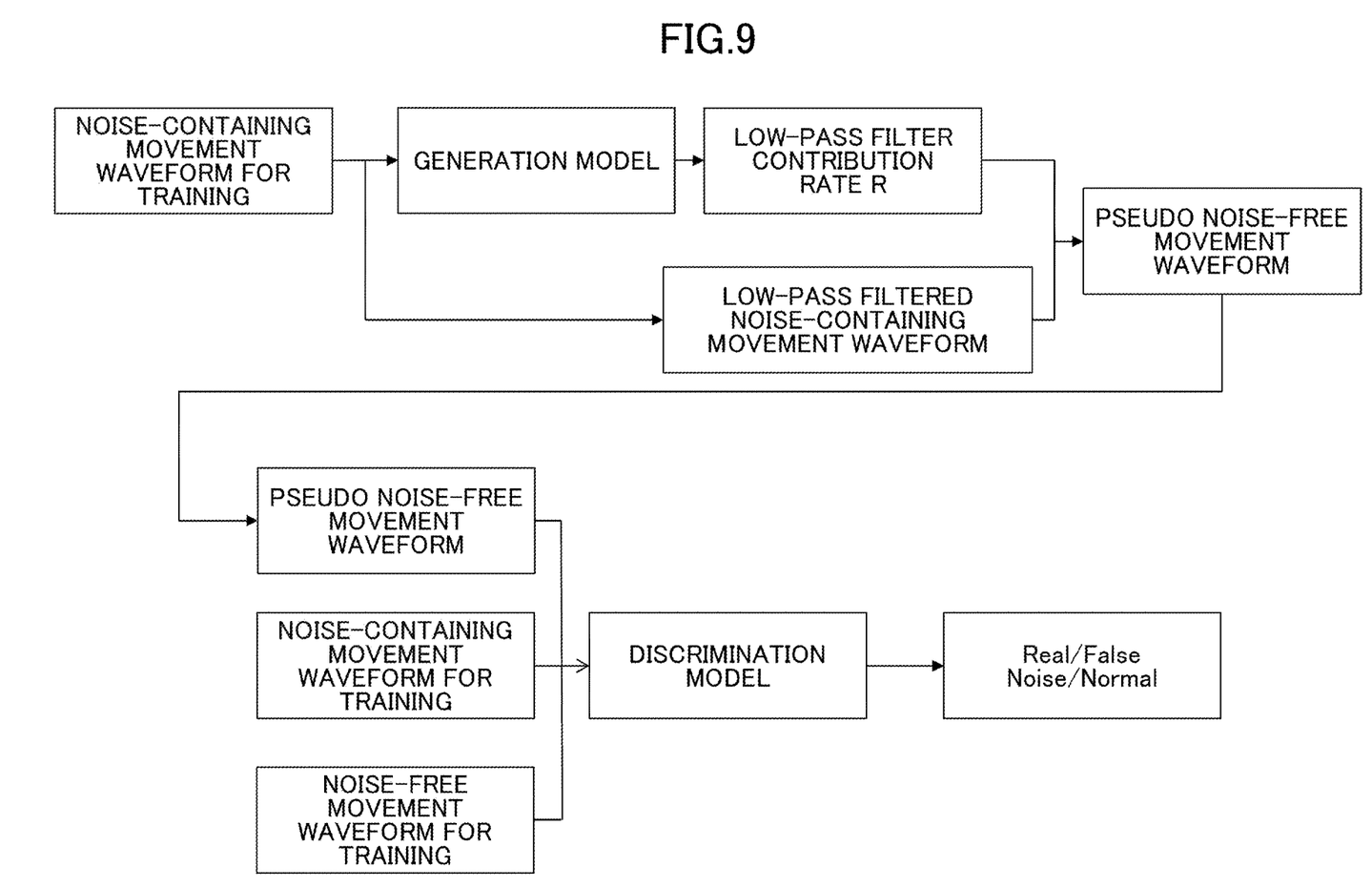
FIG. 9 is a schematic diagram illustrating a model training process according to an embodiment in the present disclosure.
Figure 10:
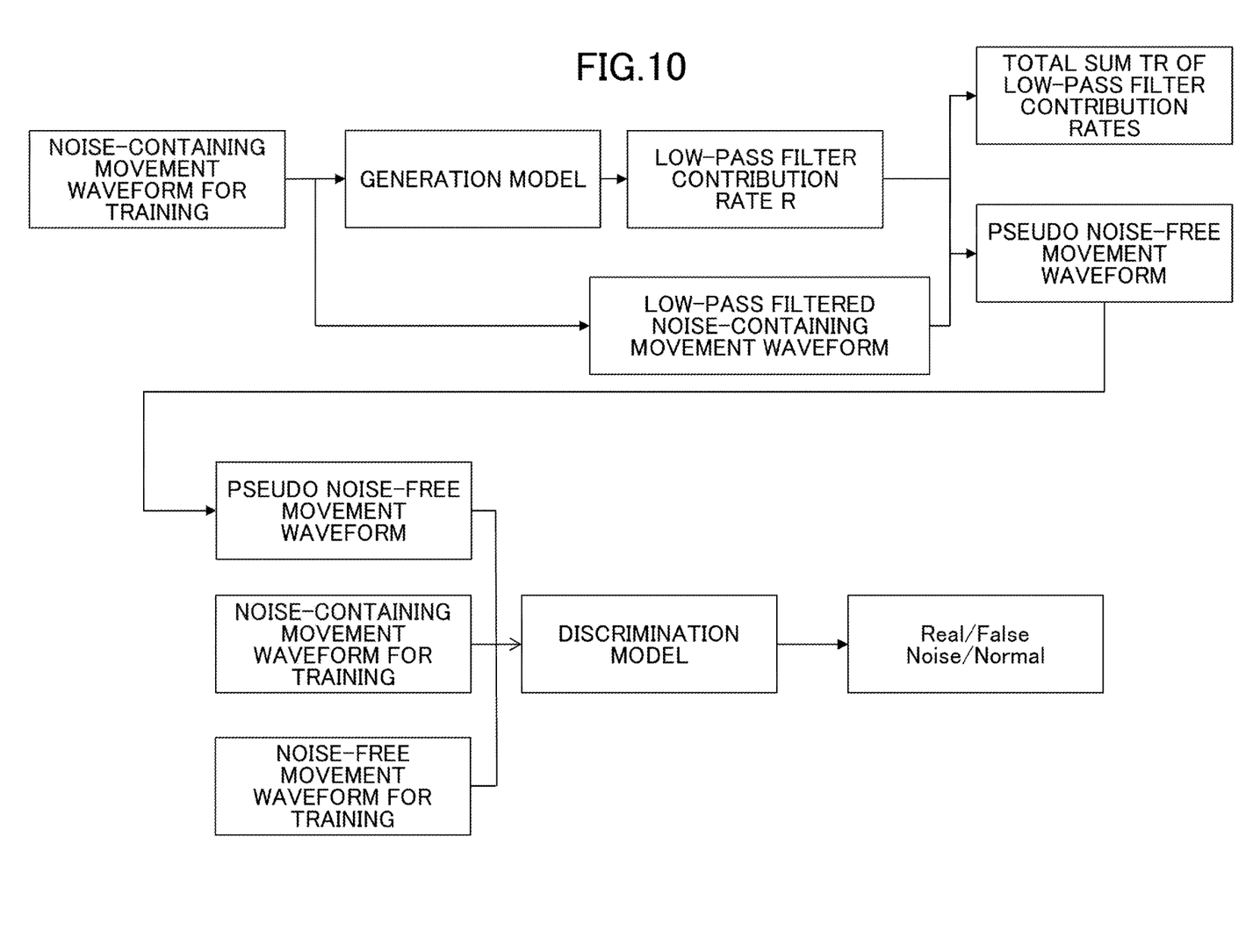
FIG. 10 is a schematic diagram illustrating a model training process according to another embodiment in the present disclosure.

Specifically, as illustrated in FIG. 9, the model training unit 220 inputs the noise-containing movement waveform data for training into the generation model to be trained, to obtain the low-pass filter contribution rate R. For example, the generation model may be implemented by a neural network. The model training unit 220 applies low-pass filtering to the entirety of the noise-containing movement waveform data for training, and based on the obtained low-pass filter contribution rate R and the low-pass filtered noise-containing movement waveform data for training, obtains pseudo noise-free movement waveform data. For example, the model training unit 220 may generate first intermediate movement waveform data by applying the low-pass filter contribution rate R to the low-pass filtered noise-containing movement waveform data for training; generate the second intermediate movement waveform data by applying (1−R) to the noise-containing movement waveform data for training; and synthesize the first intermediate movement waveform data and the second intermediate movement waveform data, to generate the pseudo noise-free movement waveform data.

Then, the model training unit 220 obtains, as input data, either one of the pseudo noise-free movement waveform data output from the generation model, the noise-containing movement waveform data for training, or the noise-free movement waveform data for training, to discriminate whether the input data is pseudo data (False) or training data (Real), and trains the discrimination model to be trained, to become capable of discriminating whether the input data is noise-free (Normal) or not (Noise).

Specifically, in the case where the discrimination model obtains pseudo noise-free movement waveform data as input data, the model training unit 220 trains the discrimination model so as to output discriminated results indicating that the input data is pseudo data (False).

Also, in the case where the discrimination model obtains noise-containing movement waveform data for training as input data, the model training unit 220 trains the discrimination model so as to output discriminated results indicating that the input data is training data (Real) and contains noise (Noise).

Also, in the case where the discrimination model obtains noise-free movement waveform data for training as input data, the model training unit 220 trains the discrimination model so as to output discriminated results indicating that the input data is training data (Real) and noise-free (Normal).

Note that in practice, a discriminated result does not need to be Boolean values of Real/False and Noise/Normal, and may be a real number value that indicates a confidence factor.

On the other hand, the model training unit 220 trains the generation model so as to output discriminated results indicating that pseudo noise-free movement waveform data is training data (Real) and is noise-free (Normal) by the discrimination model. In other words, the generation model is trained so that the discrimination model outputs false discriminated results.

For example, in the case where the generation model and the discrimination model are constituted with neural networks, the model training unit 220 may update parameters of the discrimination model so that the discrimination model outputs correct discriminated results, and update parameters of the generation model so that the discrimination model outputs false discriminated results, according to an error backpropagation method.

Then, until the termination condition is satisfied, the model training unit 220 may repeat the model training process described above. The termination condition may be specified, for example, such that the model training process has been performed with all prepared training data items.

According to the present embodiment, unlike normal GAN-based learning, instead of generating an output waveform directly, the application strength level of a low-pass filter is generated at each time. Compared to the variety of output waveforms themselves, the variety of the application strength level of the low-pass filter is lower; therefore, the generation model can be trained with relatively fewer training data items, and by having the generation model output a low-pass filter contribution rate instead of the noise-free movement waveform data, the problem of mode disruption inherent to the GAN, namely, the problem that specific data that deceives the discrimination model is output continuously regardless of the input data, can be avoided.

In one embodiment, the model training unit 220 may train the generation model and the discrimination model, based on discriminated results of the discrimination model and a total sum TR of low-pass filter contribution rates at respective times. Specifically, as illustrated in FIG. 10, for noise-containing movement waveform data for training sampled at a predetermined sampling rate, once having obtained low-pass filtered contribution rates corresponding to the respective samples, the model training unit 220 sums up the obtained low-pass filter contribution rates, to calculate the total sum TR of the low-pass filter contribution rates. The model training unit 220 may train the generation model and the discrimination model, so as to make the total sum TR of the low-pass filtered contribution rates smaller. According to the present embodiment, for waveform parts that are not affected by noise, the effect of low-pass filtering can be suppressed.

[Model Training Process]

Figure 11:
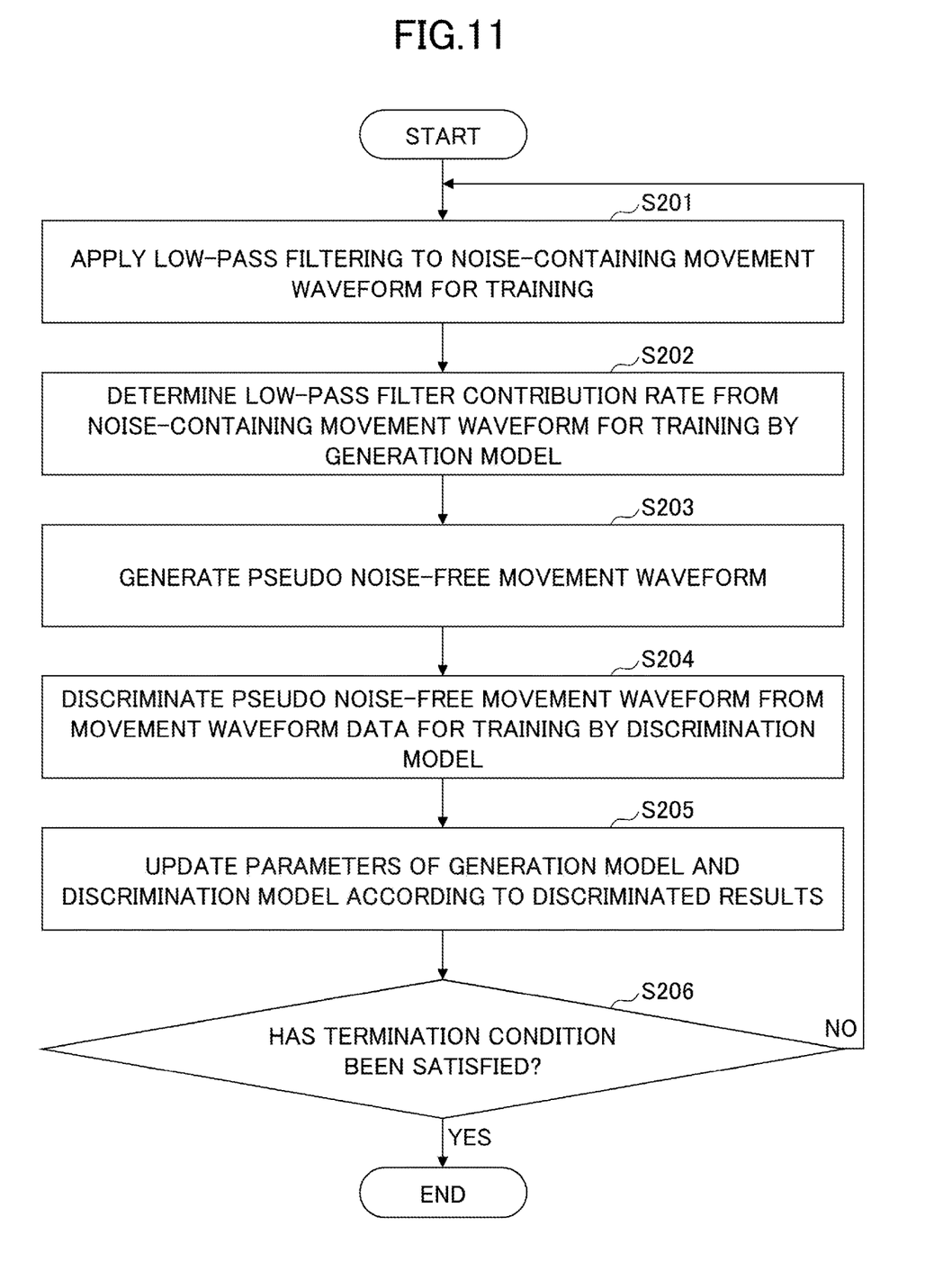
FIG. 11 is a flow chart illustrating a model training process according to an embodiment in the present disclosure.

Next, with reference to FIG. 11, a model training process according to an embodiment in the present disclosure will be described. The model training process is implemented by the model training device 200 described above, and may be implemented by, for example, a processor executing a program or instructions. FIG. 11 is a flow chart illustrating the model training process according to the embodiment in the present disclosure.

As illustrated in FIG. 11, at Step S201, the model training device 200 applies low-pass filtering to the entirety of noise-containing movement waveform data for training.

At Step S202, the model training device 200 inputs the noise-containing movement waveform data for training into the generation model to be trained, to obtain a low-pass filter contribution rate.

At Step S203, the model training device 200 multiplies the noise-containing movement waveform data for training by the low-pass filter contribution rate, to generate pseudo noise-free movement waveform data.

At Step S204, the model training device 200 inputs either one of the pseudo noise-free movement waveform data or the training data as input data into a discrimination model to be trained, to obtain discriminated results to determine whether the input data is pseudo data or training data.

At Step S205, the model training device 200 trains the discrimination model so that the discrimination model outputs correct discriminated results, and trains the generation model so that the discrimination model outputs false discriminated results. Specifically, in the case where the generation model and the discrimination model are implemented by neural networks, the model training device 200 updates parameters of the discrimination model so that the discrimination model outputs correct discriminated results, and updates parameters of the generation model so that the discrimination model outputs false discriminated results.

At Step S206, the model training device 200 determines whether a termination condition has been satisfied. The termination condition may be specified, for example, such that a predetermined number of training data items have been processed. If the termination condition is not satisfied (NO at Step S206), the model training device 200 repeats Steps S201 to S206 for the next training data item. On the other hand, if the termination condition is satisfied (YES at Step S206), the model training device 200 terminates the processing, and provides the noise waveform removing device 100 with the obtained generation model as a trained generation model.

As above, the embodiments according to the present inventive concept have been described in detail; note that the present inventive concept is not limited to the specific embodiments described above, and various modifications and alterations are possible within the scope of the subject matter according to the present inventive concept as set forth in the claims.

What is claimed is:

1. A noise waveform removing device comprising:
   at least one processor, the at least one processor being configured to:
   obtain noise-containing movement waveform data;
   using a trained generation model, determine a filter contribution rate based on the noise-containing movement waveform data;

generate first intermediate movement waveform data by applying the filter contribution rate denoted as R to filtered noise-containing movement waveform data, the filtered noise-containing movement waveform data being obtained by applying low-pass filtering to the noise-containing movement waveform data;

generate second intermediate movement waveform data by applying (1−R) to the noise-containing movement waveform data; and synthesize the first intermediate movement waveform data and the second intermediate movement waveform data, to generate noise-free movement waveform data.

2. The noise waveform removing device as claimed in claim 1, wherein the at least one processor is configured to obtain the noise-containing movement waveform data from an inertial sensor carried by a user.

3. The noise waveform removing device as claimed in claim 2, wherein the noise-free movement waveform data corresponds to movement waveform data in which noise is removed from the noise-containing movement waveform data, the noise being caused by impacts other than landing impacts of the user and detected by the inertial sensor.

4. A model training device comprising:
at least one processor; and
at least one memory,
wherein:
the at least one memory is configured to store training data including noise-containing movement waveform data for training and noise-free movement waveform data for training,
the at least one processor is configured to:
train a generation model that determines a filter contribution rate based on the noise-containing movement waveform data for training;
train a discrimination model that discriminates, from the training data, pseudo noise-free movement waveform data generated based on the filter contribution rate and the noise-containing movement waveform data for training, according to a GAN (Generative Adversarial Network);
generate first intermediate movement waveform data by applying the filter contribution rate denoted as R to filtered noise-containing movement waveform data for training, the filtered noise-containing movement waveform data for training being obtained by applying a low-pass filter to the noise-containing movement waveform data for training;
generate second intermediate movement waveform data by applying (1−R) to the noise-containing movement waveform data for training, and
synthesize the first intermediate movement waveform data and the second intermediate movement waveform data, to generate the pseudo noise-free movement waveform data.

5. The model training device as claimed in claim 4, wherein:
the discrimination model takes, as input data, one of the pseudo noise-free movement waveform data, the noise-containing movement waveform data for training, or the noise-free movement waveform data for training, and
the at least one processor is configured to discriminate, based on the discrimination model, whether the input data is pseudo data or training data, and whether the input data contains noise or is noise-free.

6. A model training device as claimed in claim 4, comprising:
at least one processor; and
at least one memory,
wherein:
the at least one memory is configured to store training data including noise-containing movement waveform data for training and noise-free movement waveform data for training,
the at least one processor is configured to train a generation model that determines a filter contribution rate based on the noise-containing movement waveform data for training, and to train a discrimination model that discriminates, from the training data, pseudo noise-free movement waveform data generated based on the filter contribution rate and the noise-containing movement waveform data for training, according to a GAN (Generative Adversarial Network), and
the at least one processor is configured to train the discrimination model so as to output correct discriminated results, and to train the generation model so as to output false discriminated results.

7. The model training device as claimed in claim 5, wherein the at least one processor is configured to train the discrimination model so as to output correct discriminated results, and to train the generation model so as to output false discriminated results.

8. A model training device comprising:
at least one processor; and
at least one memory,
wherein:
the at least one memory is configured to store training data including noise-containing movement waveform data for training and noise-free movement waveform data for training,
the at least one processor is configured to train a generation model that determines a filter contribution rate based on the noise-containing movement waveform data for training, and to train a discrimination model that discriminates, from the training data, pseudo noise-free movement waveform data generated based on the filter contribution rate and the noise-containing movement waveform data for training, according to a GAN (Generative Adversarial Network), and
the at least one processor is configured to train the generation model and the discrimination model, based on discriminated results of the discrimination model and a total sum of filter contribution rates at respective times.

9. A noise waveform removing method executed by at least one processor, the method comprising:
obtaining noise-containing movement waveform data;
using a trained generation model, determining a filter contribution rate based on the noise-containing movement waveform data;
generating first intermediate movement waveform data by applying the filter contribution rate denoted as R to filtered noise-containing movement waveform data, the filtered noise-containing movement waveform data being obtained by applying low-pass filtering to the noise-containing movement waveform data;
generating second intermediate movement waveform data by applying (1−R) to the noise-containing movement waveform data; and
synthesizing the first intermediate movement waveform data and the second intermediate movement waveform data, to generate noise-free movement waveform data.

10. A model training method executed by at least one processor, the method comprising:
- storing, in a memory, training data including noise-containing movement waveform data for training and noise-free movement waveform data for training;
- training a generation model that determines a filter contribution rate based on the noise-containing movement waveform data for training;
- training a discrimination model that discriminates, from the training data, pseudo noise-free movement waveform data generated based on the filter contribution rate and the noise-containing movement waveform data for training, according to a GAN (Generative Adversarial Network);
- generating first intermediate movement waveform data by applying the filter contribution rate denoted as R to filtered noise-containing movement waveform data for training, the filtered noise-containing movement waveform data for training being obtained by applying a low-pass filter to the noise-containing movement waveform data for training;
- generating second intermediate movement waveform data by applying (1−R) to the noise-containing movement waveform data for training; and
- synthesizing the first intermediate movement waveform data and the second intermediate movement waveform data, to generate the pseudo noise-free movement waveform data.

11. A wearable device comprising:
an inertial sensor; and
the noise waveform removing device as claimed in claim 1.

* * * * *

UNITED STATES PATENT AND TRADEMARK OFFICE
CERTIFICATE OF CORRECTION

PATENT NO. : 12,412,099 B2  
APPLICATION NO. : 17/474981  
DATED : September 9, 2025  
INVENTOR(S) : Masashi Ueda Page 1 of 1

It is certified that error appears in the above-identified patent and that said Letters Patent is hereby corrected as shown below:

In the Claims

Column 12, Line 1, delete "device as claimed in claim 4," and insert -- device --.

Signed and Sealed this  
Second Day of December, 2025

John A. Squires  
*Director of the United States Patent and Trademark Office*